J. BUTLER.
Gas Tube.
No. 28,647.
Patented June 12, 1860.
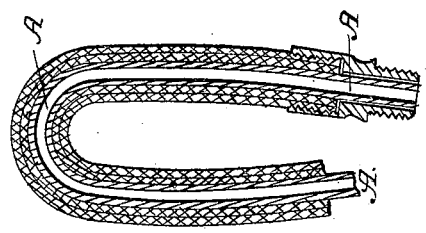

UNITED STATES PATENT OFFICE.

JOHN BUTLER, OF BROOKLYN, NEW YORK.

FLEXIBLE GAS-TUBE.

Specification of Letters Patent No. 28,647, dated June 12, 1860.

*To all whom it may concern:*

Be it known that I, JOHN BUTLER, of Brooklyn, in the county of Kings and State of New York, have invented a new and Improved Flexible Gas-Tube; and I do hereby declare that the following is a full, clear, and exact description thereof, reference being had to the accompanying drawings, forming a part of this specification, in which—

Figure 1 represents a short length of flexible gas-pipe. Fig. 2 is a section of the same showing the pipe in a bent state and the condition of the inner lead pipe where this very acute curve is given to it. Fig. 3 is a cross section of Figs. 1 and 2.

Similar letters of reference indicate corresponding parts in the several figures.

This invention is a novel improvement on the present flexible tubes which are used for connecting the portable gas stands with the stationary brackets or chandeliers for the purpose of obtaining a better light upon a table or desk, such tubes require to be made flexible in order that they may be readily adapted to various positions of the portable stand, to suit various circumstances and for this purpose they are at present composed of coiled wire covered with several thicknesses of braiding with india-rubber introduced between the braiding for making the whole perfectly air-tight without affecting the flexibility of the pipe. These pipes are attended with a very serious evil, which in a short time renders them entirely useless and irreparable, viz: the decomposing action of the carbureted hydrogen upon the india-rubber, which is an important element in such pipes. The composition of the ordinary burning gas soon softens the india-rubber covering of these tubes and forces it out through the pores of the braiding upon the surface of the pipe and permits the gas to escape in large quantities, besides the odor of the gas the decomposed rubber has a very disagreeable pungent odor, and is rendered unfit to be handled, and totally unfit to be used about a table.

To enable those skilled in the art to fully understand my invention I will proceed to describe its construction and use.

Lead pipe to posses sufficient pliancy and lightness would not answer the present purpose without previous preparation, as it would be too small for handling, liable to collapse by anything heavy laid upon it, and the greatest objection would be the injury it would receive from twisting or bending it in a variety of curves; but it has been found that this lead pipe or tubing A, is an excellent substitute for the coiled wire used in the present tubes as the case or inner lining for preventing such tubes from collapsing under various circumstances, and at the same time to admit of any degree of flexure, but the objections to such tubes have been above stated. This small lead pipe will answer for flexible gas tubes for the purposes above mentioned only when prepared and used in the following manner.

The pipe represented by A in the drawings is about the best size which can be used. This is to be covered with several thicknesses of any suitable material so as to make the entire tube about as large as represented by the three figures in the drawings, which is about the size of the present gas-tubes. The covering may consist of several layers of braiding or the body of the tube may be made of india-rubber worked around the pipe, A, until the desired diameter is attained, then the cover may be handsomely painted, or bronzed, so as to give a neat and finished appearance to the tubes. Any suitable covering which will inclose the lead pipe tightly, and which will admit of its being bent readily, will answer the desired end.

It will now be seen by reference to Fig. 2, that with a lead pipe covered, as above described, the covering prevents the pipe under all ordinary circumstances from kinking or bending into such an acute curve, as to be injured or collapsed. The inelasticity of lead pipe is another great advantage my tube has over the present tube, and frequently serious accidents occur on account of the elasticity of the present tube, and gas stands are very frequently overturned from this cause when the gas is lighted. The lead pipe tubing will therefore serve as an excellent substitute for the coiled wire tubing; the pipe which will not be affected by the gas serves as a protection to the outer covering, while the covering protects the pipe from being bent to such an extent that it will be liable to break, at the same time the lead pipe tubing will admit of any required bending.

My improved tubing will be very easy to handle, is readily bent; and will not be decomposed nor injured by the gas for which object it is especially intended.

Having thus described my invention, I claim and desire to secure by Letters Patent as an improved article of manufacture

A flexible gas conductor composed of a flexible leaden tube covered with braid or other suitable pliable non-metallic covering substantially as herein shown and described.

JNO. BUTLER.

Witnesses:
M. M. LIVINGSTON,
CHS. M. HUGHES.